United States Patent
Prabhakar

(10) Patent No.: US 10,780,927 B2
(45) Date of Patent: Sep. 22, 2020

(54) SPOILER APPARATUS FOR USE WITH VEHICLES

(71) Applicant: Toyota Motor Engineering & Manufacturing North America, Inc., Plano, TX (US)

(72) Inventor: Varun Jonathan Prabhakar, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 70 days.

(21) Appl. No.: 16/152,574

(22) Filed: Oct. 5, 2018

(65) Prior Publication Data

US 2020/0108877 A1    Apr. 9, 2020

(51) Int. Cl.
| | | |
|---|---|---|
| *B62D 35/00* | (2006.01) | |
| *B60Q 1/00* | (2006.01) | |
| *B60Q 1/30* | (2006.01) | |
| *B60R 11/04* | (2006.01) | |
| *B60R 11/00* | (2006.01) | |

(52) U.S. Cl.
CPC ......... *B62D 35/007* (2013.01); *B60Q 1/0035* (2013.01); *B60Q 1/30* (2013.01); *B60R 11/04* (2013.01); *B60R 2011/004* (2013.01)

(58) Field of Classification Search
CPC ...... B62D 35/007; B60Q 1/0035; B60Q 1/30; B60R 11/04; B60R 11/004; B60R 2011/004
See application file for complete search history.

(56) References Cited

U.S. PATENT DOCUMENTS

| | | | |
|---|---|---|---|
| 5,774,241 A * | 6/1998 | Smith ................... | B60Q 1/302 359/15 |
| 6,927,736 B1 | 8/2005 | Kornbau et al. | |
| 2006/0220825 A1* | 10/2006 | Mertens ................. | B60Q 1/20 340/479 |
| 2011/0043633 A1 | 2/2011 | Sarioglu et al. | |
| 2012/0242833 A1 | 9/2012 | Yamaguchi et al. | |
| 2013/0280452 A1* | 10/2013 | Nawroth .................. | B60J 5/107 428/35.7 |
| 2015/0323149 A1* | 11/2015 | Salter ................... | H05B 47/105 362/510 |
| 2015/0362172 A1* | 12/2015 | Gabriel ................ | G08B 15/001 348/151 |
| 2016/0318560 A1* | 11/2016 | Kishima ............... | B62D 35/007 |
| 2017/0174263 A1* | 6/2017 | Thompson ........... | B62D 23/005 |
| 2018/0154746 A1* | 6/2018 | Lee .......................... | B29C 65/02 |

(Continued)

FOREIGN PATENT DOCUMENTS

| | | |
|---|---|---|
| DE | 10 2013 005 339 A1 | 10/2014 |
| JP | 4-138943 | 5/1992 |

(Continued)

*Primary Examiner* — Lori L Lyjak
(74) *Attorney, Agent, or Firm* — Oblon, McClelland, Maier & Neustadt, L.L.P.

(57) ABSTRACT

Spoiler apparatus for use with vehicles are disclosed. A disclosed spoiler for a vehicle includes a sensor operatively couple to the vehicle. The spoiler also includes a body supporting the sensor and including an aperture positioned thereon. The body is coupled to an exterior vehicle surface near a lamp of the vehicle, separate from the spoiler, such that the lamp is exposed via the aperture.

22 Claims, 3 Drawing Sheets

(56) References Cited

U.S. PATENT DOCUMENTS

| | | | | |
|---|---|---|---|---|
| 2018/0215313 A1* | 8/2018 | Diessner | ............... | H04N 7/181 |
| 2018/0281669 A1* | 10/2018 | Dziurda | ............... | B62D 35/007 |
| 2018/0361916 A1* | 12/2018 | King | ............... | B60Q 1/50 |
| 2019/0054855 A1* | 2/2019 | Krishnan | ............... | B60Q 1/2661 |
| 2019/0054962 A1* | 2/2019 | Potvin | ............... | B62D 35/007 |
| 2019/0080637 A1* | 3/2019 | Kanaguchi | ............... | G09F 21/048 |
| 2019/0329698 A1* | 10/2019 | Leonard | ............... | B62D 37/02 |

FOREIGN PATENT DOCUMENTS

| | | |
|---|---|---|
| JP | 04286280 | 10/1992 |
| JP | 6-92184 | 4/1994 |
| KR | 10-0507408 | 5/2004 |

\* cited by examiner

SPOILER APPARATUS FOR USE WITH VEHICLES

FIELD OF THE DISCLOSURE

This disclosure relates generally to vehicles and, more particularly, to spoiler apparatus for use with vehicles.

BACKGROUND

Motor vehicles typically employ spoilers to improve vehicle aerodynamic characteristics and/or serve as an accessory desired by a driver or vehicle owner. For example, a vehicle may have a spoiler positioned on a roof or trunk such that when vehicle is driving, the spoiler reduces drag experienced by the vehicle, which improves vehicle fuel economy.

SUMMARY

An example spoiler for a vehicle includes a sensor operatively couple to the vehicle. The spoiler also includes a body supporting the sensor and including an aperture positioned thereon. The body is coupled to an exterior vehicle surface near a lamp of the vehicle, separate from the spoiler, such that the lamp is exposed via the aperture.

An example vehicle includes a lamp. The vehicle also includes a spoiler, separate from the lamp, coupled to the vehicle near the lamp. A body of the spoiler has a contour that extends around the lamp to form an aperture in which the lamp is positioned. The lamp emits light through the aperture.

An example apparatus includes a vehicle spoiler. A body of the vehicle spoiler defines a first aperture and a second aperture proximate to the first aperture. The first aperture is configured to receive a sensor or a cap, and the second aperture is configured to receive a lamp positioned on a vehicle such that the lamp is visible from a location external to the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
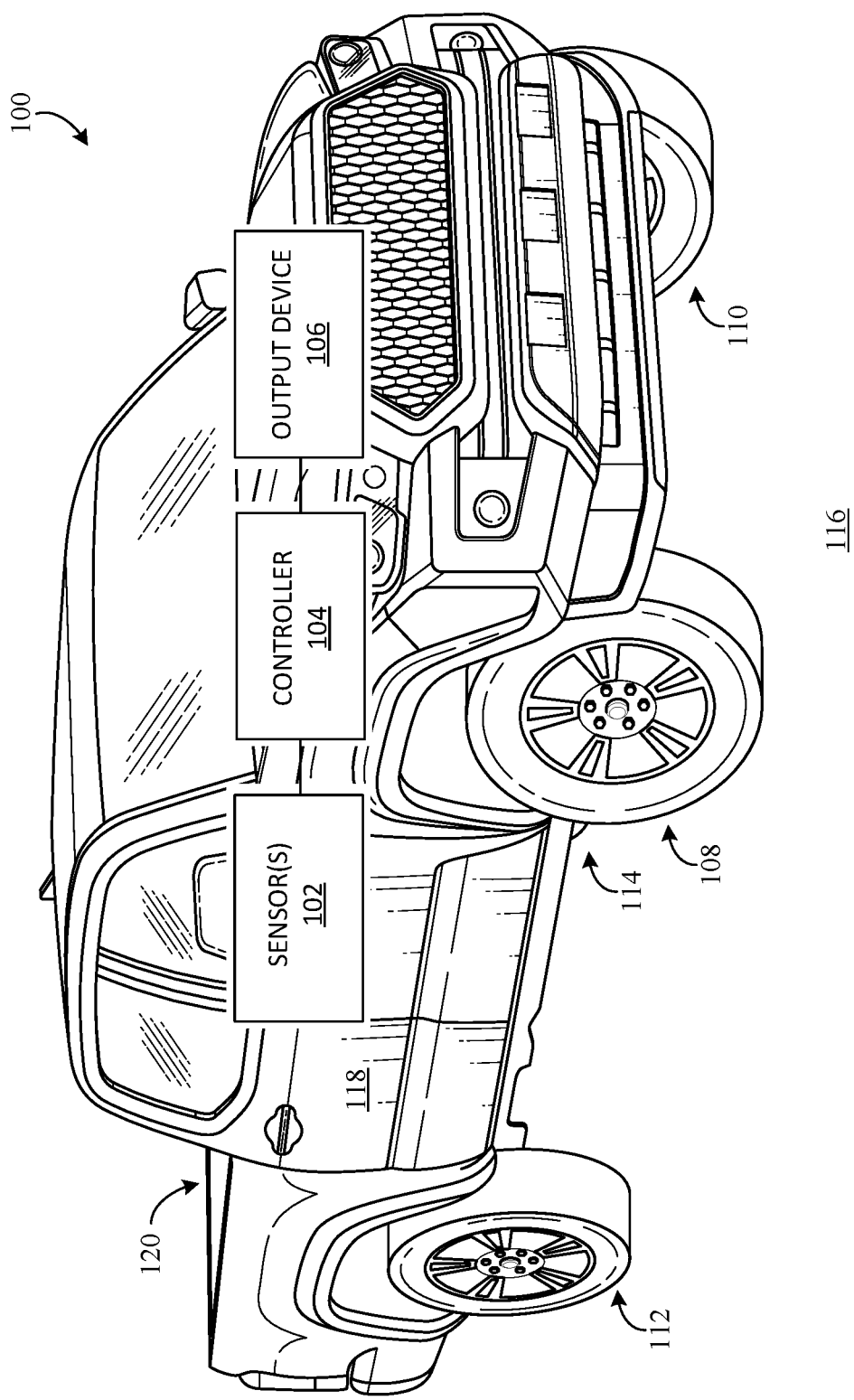
FIG. 1 is a view of an example vehicle in which examples disclosed herein can be implemented.

Some known vehicle spoilers have integrated electronic and/or lighting components to facilitate vehicle operation. For example, a known spoiler includes a camera and a lamp that are coupled to a body of the spoiler. Often, such known spoilers are mounted on a roof of a vehicle in an area that already has an existing lamp (e.g., a center high mounted stop lamp (CHMSL)), which may be required to satisfy or meet vehicle regulations. As a result, the existing vehicle lamp has to be dismounted or decoupled from the vehicle to accommodate these known spoilers. Further, the vehicle lamp may need to be reinstalled and/or replaced when a known spoiler is no longer desired by a driver or vehicle owner. However, improperly removing, reinstalling, replacing, and/or interacting with these existing vehicle lamps may allow water or other fluids to leak into a vehicle cabin via lamp architecture. Thus, the above mentioned known vehicle spoilers create risk of fluid intrusion into the vehicle cabin due to user error.

Spoiler apparatus for use with vehicles are disclosed. Examples disclosed herein provide an example spoiler that is configured to couple (e.g., removably couple) to an exterior portion (e.g., a roof) of a vehicle, which serves as a garnish for the vehicle and/or improves one or more of vehicle fuel economy, handling, and/or maneuverability. In particular, the disclosed spoiler includes a body that is sized, shaped, structured, and/or otherwise configured to fit around an existing lamp (e.g., a CHMSL) of the vehicle, separate from the spoiler, such that the spoiler does not interfere with the lamp and/or operation thereof. That is, the disclosed spoiler does not include a lamp of the vehicle. The body of the spoiler is formed by one or more components that may be configured to hide attachment features of the spoiler and/or define complex, stylized surfaces, which may be desired by a driver or vehicle owner and/or enhances marketability of the spoiler. More particularly, the body is positioned proximate to but does not cover the lamp of the vehicle such that the lamp is exposed and/or otherwise substantially visible from a location external to the vehicle to meet or satisfy vehicle regulation(s) associated with the lamp. For example, the body includes a first aperture in which the lamp is positioned. In this manner, the spoiler can be coupled to and/or decoupled from the vehicle without removing, reinstalling, replacing, and/or otherwise interacting with the existing vehicle lamp, which would have otherwise been unattainable by using the above mentioned known vehicle spoilers. As a result, disclosed examples reduce and/or eliminate the risk of fluid intrusion into the vehicle that is associated with the above mentioned known vehicle spoilers.

In some examples, the body of the spoiler is configured to carry and/or support one or more functional components that facilitate operation of the vehicle such as, for example, one or more sensors (e.g., rear-facing camera(s)), one or more sensor washers, etc. In such examples, the body includes a second aperture near the first aperture to receive a sensor and enable the sensor to couple to the body. Further, in examples where the spoiler is not provided with the functional component(s), the second aperture is covered by a non-functional component or cap (sometimes referred to as a dummy piece) to maintain an aesthetic design of the spoiler. Further still, in some examples, the spoiler includes an example lens (e.g., clear or with dark/colored tinting) that couples to the body and covers the first aperture and the lamp. In such examples, the spoiler creates an impression of a recessed lamp image while also allowing adequate or sufficient illumination (in terms of area and intensity) for the lamp to meet or satisfy the vehicle regulation(s) associated therewith.

FIG. 1 is a view of an example vehicle (e.g., a truck, a sport utility vehicle (SUV), a van, a car, etc.) 100 in which examples disclosed herein can be implemented. According to the illustrated example of FIG. 1, the vehicle 100 includes one or more example sensor(s) 102, an example controller 104, an example output device 106, and one or more examples wheels 108, 110, 112, 114 (sometimes referred to as road wheels), four of which are shown in this examples, (i.e., a first or front wheel 108, a second or front wheel 110, a third or rear wheel 112, and a fourth or rear wheel 114). The wheel(s) 108, 110, 112, 114 of FIG. 1 engage a driving surface (e.g., concrete, asphalt, dirt, sand, etc.) 116 on which the vehicle 100 is positioned to provide traction to the vehicle 100 while driving. In some examples, the vehicle 100 is implemented with one or more aerodynamic and/or aesthetic features (e.g., a spoiler), which may improve vehicle fuel economy, handling, and/or maneuverability, as discussed further below in connection with FIGS. 2 and 3.

The sensor(s) 102 of FIG. 1 include one or more cameras (e.g., a bed view camera, a full display mirror camera, a proximity sensor, etc.) and/or any other appropriate sensor(s) that facilitate operation of the vehicle 100, improve vehicle performance, and/or improve vehicle safety. In particular, the sensor(s) 102 are disposed proximate to or on an exterior surface 118 of the vehicle 100 and configured to generate, obtain, and/or otherwise provide data associated with the vehicle 100 and/or the driving surface 116. For example, the sensor(s) 106 provides image data that may be presented to a driver or vehicle occupant via the output device 106.

The controller 104 of FIG. 1 is operatively coupled to the vehicle 100 and may be implemented, for example, using one or more electronic control units (ECUs). In particular, the controller 104 is communicatively coupled to the sensor(s) 102 and the output device 106, for example, via a signal or transmission wire, a bus, radio frequency, etc. In some examples, the controller 102 receives data from the sensor(s) 102 and, in response, controls the output device 106, which assists or aids a driver in operating the vehicle 100.

The output device 106 of FIG. 1 includes a display device such as, for example, a liquid crystal display (LCD) (e.g., a mirror display), a light-emitting diode (LED) display, a touchscreen, a mobile device, a tablet, etc. As such, the output device 106 may be positioned in the vehicle 100 to allow a driver to view the output device 106 while operating the vehicle 100. In some examples, the controller 104 controls, based on the sensor data, the output device 106 to present one or more images to a driver or vehicle occupant that indicate or show, for example, a bed 120 of the vehicle 100, portions of the driving surface 116 behind and/or on side(s) of the vehicle 100, other vehicles, pedestrians, etc.

Figure 2:
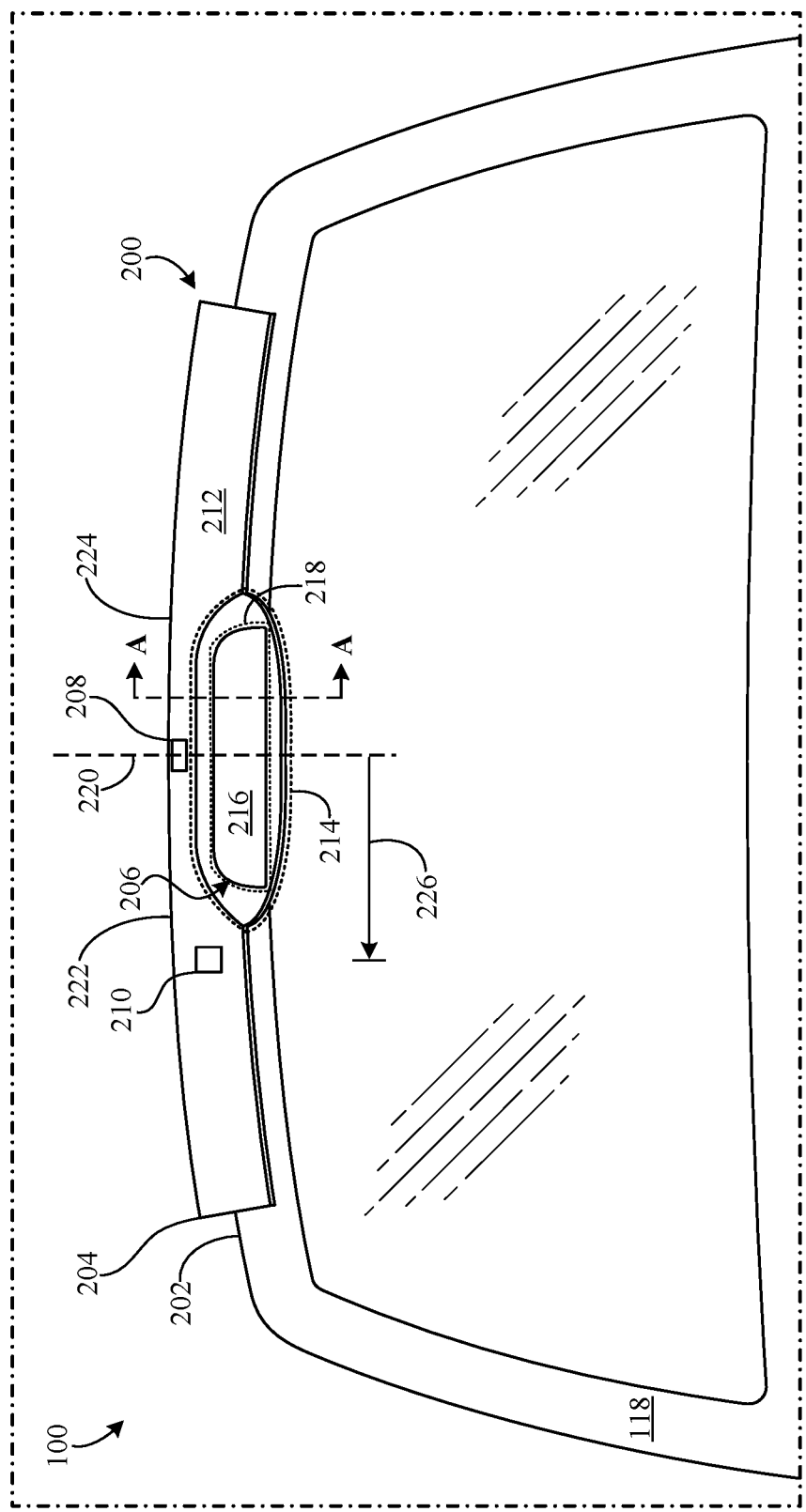
FIG. 2 is a rear-view of the example vehicle of FIG. 1 and shows an example vehicle spoiler in accordance with the teachings of this disclosure.

FIG. 2 is rear-view of the vehicle 100 of FIG. 1 and shows an example spoiler 200 in accordance with the teachings of this disclosure. As shown in FIG. 2, the spoiler 200 is positioned on a portion (e.g., a roof 202) of the exterior surface 118 of the vehicle 100. In some examples, the spoiler 200 of FIG. 2 is structured and/or configured to reduce drag experienced by the vehicle 100 when the vehicle 100 is moving, which improves vehicle fuel economy. In some examples, the spoiler 200 generates downforce for the vehicle 100 (e.g., increases force or pressure experienced by the wheel(s) 108, 110, 112, 114) via an airflow received by the spoiler 200, which improves vehicle handling and/or maneuverability. Additionally or alternatively, in some examples, the spoiler 200 serves as an aesthetic feature or garnish that includes one or more components forming a particular visual design (e.g., one or more of a shape, geometry, a structure, a color, a graphic, etc.) of the spoiler 200, which may be desirable to the driver or a vehicle owner. In particular, the spoiler 200 includes an example body 204 that is sized, shaped, structured, and/or otherwise configured to conform to existing architecture of an example lamp (e.g., a CHMSL) 206 of the vehicle 100 that is separate from the spoiler 200 such that the spoiler 200 does not interfere with operation of the lamp 206, as discussed further below. That is, the lamp 206 is positioned on the vehicle 100 but is not positioned on or is not coupled to the spoiler 200.

The vehicle spoiler 200 of FIG. 2 includes one or more example sensors 208, 210 that are carried and/or supported by the body 204, two of which are shown in this example (i.e., a first sensor 208 and a second sensor 210). In some examples, the first sensor 208 and/or the second sensor 210 correspond to the senor(s) 102 of FIG. 1. Accordingly, in such examples, the first and second sensors 208, 210 are operatively coupled to the vehicle 100 and/or communicatively coupled to the controller 104. As shown in FIG. 2, the first and second sensors 208, 210 are exposed to an exterior of the vehicle 100 and are rear-facing. That is, in this example, the sensor(s) 208, 210 are directed toward or face the vehicle bed 120. However, in some examples, the first sensor 208 and/or the second sensor 210 face in a different direction Although FIG. 2 depicts the spoiler 200 on the roof 202, in some examples, the spoiler 200 is positioned on a different portion of the vehicle 100 such as, for example, a vehicle trunk and/or any other appropriate vehicle location. Further, although FIG. 2 depicts the spoiler 200 having the two sensors 208, 210, in some examples, the spoiler 200 is implemented with fewer, additional, or different sensors.

The body of FIG. 2 is coupled (e.g., removably coupled) the vehicle 100, for example, via one or more fasteners (e.g., a bolt, a screw, etc.) and/or one or more fastening methods or techniques (e.g., via an adhesive, welding, etc.). In some examples, the body 204 of the spoiler 200 is structured and/or configured to decouple or separate from the vehicle 100, which allows another or different spoiler (e.g., having a different visual design) to affix to the vehicle 100. The body 204 is constructed of one or more materials having sufficient or desired mechanical properties (e.g., strength, rigidity, etc.), and/or thermal properties. For example, the body 204 includes one or more of plastic (e.g., acrylonitrile butadiene styrene (ABS)), fiberglass, carbon fiber, silicon, and/or any other appropriate material.

As shown in FIG. 2, the body 204 of the spoiler 200 includes an outer surface 212 that defines a first example contour 214 (as represented by the dotted/dashed lines of FIG. 2). Further, the lamp 206 includes an outer surface 216 that defines a second example contour 218 (as represented by the dotted/dashed lines of FIG. 2). The first contour 214 is spaced from and/or extends at least partially (e.g., entirely) around the second contour 218 to form an aperture 302 (shown in FIG. 3) in which the lamp 206 is positioned such that the lamp 206 is visible from a location outside of or external to the vehicle 100. Additionally, in some examples, the first contour 214 has a shape or geometry that matches and/or is similar to a shape or geometry of the second contour 218.

The sensor(s) 208, 210 of FIG. 2 may be positioned on various areas of the body 204. In some examples, at least one of the sensor(s) 208, 210 is centrally positioned on the body 204. For example, as shown in FIG. 2, the first sensor 208 is substantially positioned on and/or aligned to an example axis (and/or a plane) (e.g., an axis or plane of symmetry) 220 of the body 204. In particular, in such examples, the body 204 is symmetric relative to the axis 220 whereby a first portion (e.g., a left portion) 222 of the body 204 to the left (in the orientation of FIG. 2) of the axis 220 is sized and/or shaped the same as or similar to a second portion (e.g., a right portion) 224 of the body 204 to the right (in the orientation of FIG. 2) of the axis 220. Further, in some examples, at least one of the sensor(s) 208, 210 is positioned offset to the axis 220. For example, as shown in FIG. 2, the second sensor 210 is positioned on a side of the lamp 206 and spaced from the axis 220 by a distance (e.g., 6 inches, 12 inches, 24 inches, etc.) 226.

Figure 3:
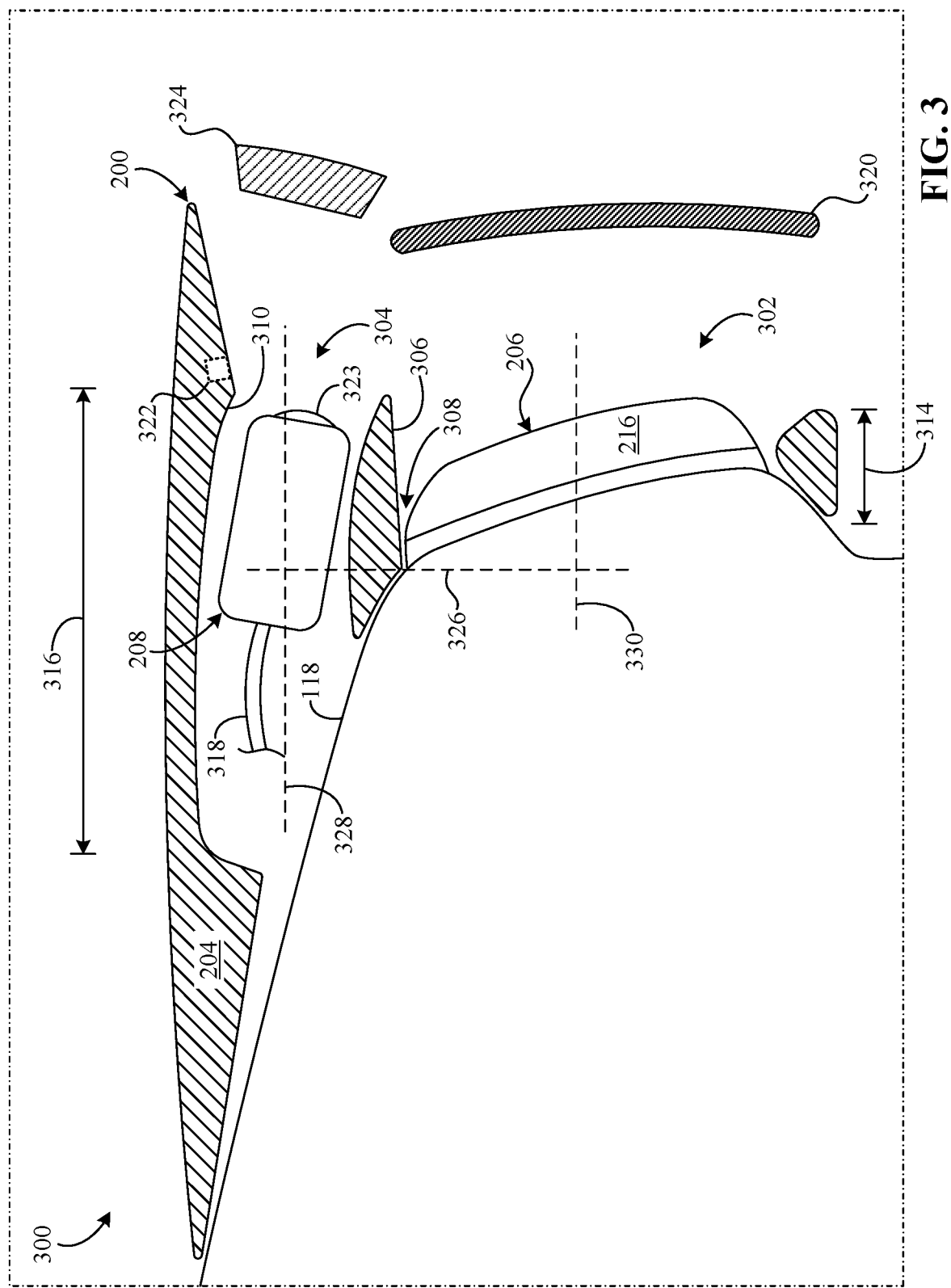
FIG. 3 is a cross-sectional view of the example vehicle spoiler of FIG. 2 along line A-A and shows an example configuration thereof.

FIG. 3 is a cross-sectional view of the spoiler 200 of FIG. 2 along line A-A and shows an example configuration 300 thereof. According to the example of FIG. 3, spoiler 200 includes a first example aperture 302 and a second example aperture 304, proximate to the first aperture 302, that are positioned on and/or defined by the body 204. The first aperture 302 of FIG. 3 is sized, shaped, structured, and/or otherwise configured to receive and/or house at least a portion of the lamp 206 such that the lamp 206 is exposed via the first aperture 302. That is, light generated and emitted by the lamp 206 passes through the first aperture 302. Accordingly, the first aperture 302 extends entirely through the body 204. As a result, the spoiler 200 does not interfere with functionality of the lamp 206. Additionally, in some examples, the first aperture 302 allows access to the lamp 302 by a user such, for example, vehicle servicer personnel, a driver, etc. As shown in FIG. 3, the first aperture 302 defines a first example surface 306 (e.g., an inner surface) of the body 204 that is spaced from the outer surface 216 of the lamp 204 such that a gap 308 is formed therebetween. In such examples, the body 204 does not contact any portion of the lamp 206. Further, in examples where the first contour 214 extends entirely around the lamp 206, the gap 308 of FIG. 3 surrounds the lamp 206.

The second aperture 304 of FIG. 3 is sized, shaped, structured, and/or otherwise configured to receive and/or house at least the first sensor 208 and/or one or more components associated therewith (e.g., a wire harness). As shown in FIG. 3, the second aperture 304 defines a second example surface (e.g., an inner surface) 310 of the body 204 that, in this example, surrounds the first sensor 208. In the illustrated example of FIG. 3, the second aperture 304 extends entirely through the body 204 such that the second surface 310 and the exterior vehicle surface 118 substantially form a first example cavity in which the first sensor 208 is positioned. However, in some examples, the second aperture 304 extends only partially through the body 204 to form the first cavity in the body 204. Similarly, in some examples, the first aperture 302 forms a second example cavity with the first surface 306, the outer surface of the lamp 206, and an area of the exterior vehicle surface 118 that is proximate to and/or surrounds the lamp 206.

As shown in FIG. 3, the second aperture 304 extends deeper or further into the body 204 relative to the first aperture 302. For example, the first aperture 302 of FIG. 3 has a first length 314 and the second aperture 304 has a second length 316 greater than the first length 314. Further, in some examples, the first aperture 302 includes a cross-sectional area that is substantially larger than a cross-sectional area of the second aperture 304. In some such examples, the first aperture 302 is substantially larger than the first aperture 304. That is, in such examples, the first aperture 302 includes a width and/or a height along the first length 314 that is greater than a width and/or a height of the second aperture 304 along the second length 316.

In some examples, the lamp 206 and the first sensor 208 are centrally disposed in the respective first and second apertures 302, 304. The first sensor 208 of FIG. 3 is coupled (e.g., removably coupled) to the second surface 310 and/or the body 204, for example, via one or more fasteners and/or fastening methods or techniques. In some examples, the first sensor 208 is positioned directly on the second surface 310. In other examples, the first sensor 208 is coupled to the body 204 via one or more components (e.g., a bracket) interposed between the first sensor 208 and the second surface 310. Further, the first sensor 208 of FIG. 3 includes an example wire 318 that extends from a leftmost (in the orientation of FIG. 3) portion of the first sensor 208 through the second aperture 304 to the vehicle 100, thereby communicatively coupling the first sensor 208 to the vehicle controller 104. However, in some examples, the first sensor 208 is implemented without the wire 318 and, instead, is communicatively coupled to the vehicle controller 104 via a wireless connection, for example, via Wi-Fi connectivity, Bluetooth connectivity, etc. In such examples, the first sensor 208 may include a transmitter that sends data (e.g., image data) to a receiver of the vehicle controller 104.

Additionally, in some examples, the spoiler 200 includes an example lens 320, which is separated from the body 204 in this example. The lens 320 of FIG. 3 is configured to couple (e.g., removably couple) to the body 204, for example, via one or more fasteners and/or fastening methods or techniques. In particular, when positioned on and/or coupled to the body 204, the lens 320 partially or entirely covers the first aperture 302 and the lamp 206. Further, the lens 320 forms an enclosed space in the body 204 in which the lamp 206 is positioned.

The lens 320 of FIG. 3 may be clear and/or include colored tinting and is constructed of one or more transparent materials (e.g., Polycarbonate (PC), Polymethyl Methacrylate (PMMA), etc.) such that the lens 320 sufficiently transmits the light generated and/or emitted by the lamp 206. Stated differently, the lens 320 is transparent to allow the light to pass through the lens 320. In this manner, the spoiler 200 creates an impression of a lamp of the vehicle 100 without being implemented with a lamp.

Additionally, in some examples, the spoiler 200 includes one or more example nozzles 322 (sometimes referred to as sensor or camera washers) to facilitate cleaning the first sensor 208 (and/or one or more other vehicle sensors), one of which is shown in this example. As shown in FIG. 3, the nozzle 322 is coupled to the body 204 and positioned near a portion (e.g., a lens) 323 of the first sensor 208. In such examples, the nozzle 322 of FIG. 3 is structured and/or configured to the spray a fluid (e.g., a cleaning solution) on the portion 323 of the first sensor 208, thereby removing debris (e.g., bugs, dirt, dust, ice, snow, etc.) that may interfere with operation of the first sensor 208. As such, the nozzle 322 is operative coupled to a fluid supply system (e.g., a fluid line, a pump, a fluid reservoir, etc.) to receive the fluid.

Additionally, in some examples, the spoiler 200 includes an example cap 324 (sometimes referred to as a dummy piece) to hide the second aperture 304 when the first sensor 208 is not positioned therein (e.g., before or after mounting the spoiler 200 on the vehicle 100), which is separated from the body 204 in this example. In such examples, the cap 324 is sized, shaped, structured, and/or otherwise configured to couple (e.g., removably couple) to the body 204 and fill at least a portion of the second aperture 304. When positioned on and/or coupled to the body 204, the cap 324, the second surface 310, and a portion of the exterior surface 118 form an enclosed space in the body 204.

Additionally, in some examples, the first aperture 302 and the second aperture 304 are aligned to a vertical axis (e.g., the axis 220) 326. That is, in such examples, an axis 328 of the first aperture 302 and an axis 330 of the second aperture 304 are substantially positioned on and/or extend through the vertical axis 326. Further, in some examples, the axes 328, 330 are substantially positioned on a horizontal axis. Although FIG. 3 only depicts aspects in connection with the second aperture 304 and the first sensor 208, in some examples, such aspects likewise apply to one or more other sensor apertures (e.g., another aperture of the body 204 in which the second sensor 210 is positioned).

It will be appreciated that spoiler apparatus for use with vehicles disclosed in the foregoing description provide numerous advantages. Examples disclosed herein enable a disclosed spoiler to couple to a vehicle near a lamp of the vehicle without interfering with operation of the lamp and/or without requiring the lamp to be removed, reinstalled, and/or replaced, which reduces and/or eliminates risk of fluid(s) leaking into the vehicle resulting from user error in interacting with the lamp.

Although certain example apparatus and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A spoiler for a vehicle, comprising:
   a sensor operatively couple to the vehicle; and
   a body supporting the sensor and including an aperture disposed thereon, the body coupled to an exterior vehicle surface near a lamp of the vehicle, separate from the spoiler, such that the lamp is exposed via the aperture.

2. The spoiler of claim 1, further including a lens coupled to the body and covering the aperture and the lamp.

3. The spoiler of claim 1, wherein the sensor is centrally disposed on the spoiler.

4. The spoiler of claim 1, wherein the sensor is a camera.

5. The spoiler of claim 4, wherein the camera faces a bed of the vehicle.

6. The spoiler of claim 1, wherein an inner surface of the body defined by the aperture is spaced from an outer surface of the lamp.

7. The spoiler of claim 1, wherein the body is positioned on a roof of the vehicle.

8. The spoiler of claim 1, wherein the body is configured to decouple from the vehicle.

9. A vehicle, comprising:
   a lamp; and
   a spoiler, separate from the lamp, coupled to the vehicle near the lamp, a body of the spoiler having a contour that extends around the lamp to form an aperture in which the lamp is positioned, the lamp to emit light through the aperture.

10. The vehicle of claim 9, further including a sensor coupled to the body of the spoiler.

11. The vehicle of claim 10, wherein the sensor is positioned in a cavity formed by a surface of the body and an exterior surface of the vehicle.

12. The vehicle of claim 10, wherein the sensor is offset relative to a central portion of the spoiler.

13. The vehicle of claim 9, wherein the body is positioned on a trunk of the vehicle.

14. The vehicle of claim 9, wherein the lamp is a center high mounted stop lamp.

15. An apparatus, comprising:
    a vehicle spoiler, a body of the vehicle spoiler defining a first aperture and a second aperture proximate to the first aperture, the first aperture configured to receive a sensor or a cap, and the second aperture configured to receive a lamp positioned on a vehicle such that the lamp is visible from a location external to the vehicle;
    wherein the first aperture extends into the body further than the second aperture.

16. The apparatus of claim 15, wherein the first aperture includes a first axis and the second aperture includes a second axis, the first axis and the second axis positioned on a vertical or horizontal axis.

17. The apparatus of claim 15, wherein the vehicle spoiler includes a lens that is coupled to the body and extends over the second aperture.

18. The apparatus of claim 17, wherein the lens is transparent to allow light to pass therethrough.

19. An apparatus, comprising:
    a vehicle spoiler, a body of the vehicle spoiler defining a first aperture and a second aperture proximate to the first aperture, the first aperture configured to receive a sensor or a cap, and the second aperture configured to receive a lamp positioned on a vehicle such that the lamp is visible from a location external to the vehicle;
    wherein the first aperture includes a cross-sectional area that is larger than a cross-sectional area of the second aperture.

20. The apparatus of claim 19, wherein the first aperture includes a first axis and the second aperture includes a second axis, the first axis and the second axis positioned on a vertical or horizontal axis.

21. The apparatus of claim 19, wherein the vehicle spoiler includes a lens that is coupled to the body and extends over the second aperture.

22. The apparatus of claim 21, wherein the lens is transparent to allow light to pass therethrough.

* * * * *